(12) United States Patent
Jin et al.

(10) Patent No.: US 11,731,902 B2
(45) Date of Patent: *Aug. 22, 2023

(54) TEXTURED GLASS ARTICLES AND METHODS OF MAKING THE SAME

(71) Applicant: CORNING INCORPORATED, Corning, NY (US)

(72) Inventors: Yuhui Jin, Painted Post, NY (US); Aize Li, Painted Post, NY (US); Qiao Li, Horseheads, NY (US); Wei Sun, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,626

(22) Filed: Apr. 4, 2022

(65) Prior Publication Data
US 2022/0220025 A1    Jul. 14, 2022

Related U.S. Application Data

(63) Continuation of application No. 16/886,558, filed on May 28, 2020, now Pat. No. 11,306,024.

(Continued)

(51) Int. Cl.
*C03C 21/00* (2006.01)
*C03C 15/00* (2006.01)
(Continued)

(52) U.S. Cl.
CPC ............ *C03C 21/002* (2013.01); *C03C 3/085* (2013.01); *C03C 4/0092* (2013.01); *C03C 15/00* (2013.01);
(Continued)

(58) Field of Classification Search
CPC ............ Y10T 428/24355; C03C 3/085; C03C 4/0092; C03C 2204/08
See application file for complete search history.

(56) References Cited

U.S. PATENT DOCUMENTS

| 4,168,113 A | 9/1979 | Chang et al. |
| 4,849,002 A | 7/1989 | Rapp |

(Continued)

FOREIGN PATENT DOCUMENTS

| CN | 102531384 A | 7/2012 |
| CN | 104661976 A | 5/2015 |

(Continued)

OTHER PUBLICATIONS

[NPL-1] Ferwerda, et al., "Perception of sparkle in anti-glare display screens." Journal of the Society for Information Display, 2014; (DOI# 10.1002/jsid.223); <https://jamesferwerda.files.wordpress.com/2015/06/j18Jerwerda14Jsid.pdf>. (Year: 2014).

(Continued)

*Primary Examiner* — David Sample
*Assistant Examiner* — Donald M Flores, Jr.
(74) *Attorney, Agent, or Firm* — William J. Tucker

(57) ABSTRACT

A glass article is provided that includes: a glass substrate comprising a thickness and a primary surface; and a textured region defined by the primary surface. The textured region comprises a plurality of sub-surface hillocks, each hillock having a top surface and a base, the base located below the primary surface of the substrate. The plurality of hillocks comprises an average lateral feature size from 0.1 μm to 3 μm and an average height from 5 nm to 200 nm. Further, the primary surface of the substrate is substantially planar.

20 Claims, 5 Drawing Sheets

Related U.S. Application Data

(60) Provisional application No. 62/854,714, filed on May 30, 2019.

(51) Int. Cl.
*C03C 3/085* (2006.01)
*C03C 4/00* (2006.01)

(52) U.S. Cl.
CPC ... *C03C 2204/08* (2013.01); *Y10T 428/24355* (2015.01)

(56) References Cited

U.S. PATENT DOCUMENTS

| | | | |
|---|---|---|---|
| 8,778,496 | B2 | 7/2014 | Hart |
| 9,411,180 | B2 | 8/2016 | Gollier et al. |
| 9,588,263 | B2 | 3/2017 | Gollier et al. |
| 9,701,579 | B2 | 7/2017 | Gollier et al. |
| 11,306,024 | B2 * | 4/2022 | Jin ................ C03C 21/002 |
| 2015/0174625 | A1 | 6/2015 | Hart et al. |
| 2016/0251259 | A1 * | 9/2016 | Bazemore ............. C03C 15/00 |
| | | | 428/156 |
| 2018/0086662 | A1 | 3/2018 | Luzzato et al. |
| 2018/0215657 | A1 * | 8/2018 | Jin ................ C03C 21/001 |
| 2018/0282201 | A1 * | 10/2018 | Hancock, Jr. ........... C03C 17/32 |
| 2019/0016627 | A1 | 1/2019 | Li et al. |
| 2019/0389764 | A1 | 12/2019 | Andrews et al. |
| 2020/0017400 | A1 | 1/2020 | Chen et al. |
| 2020/0095160 | A1 | 3/2020 | Jin et al. |

FOREIGN PATENT DOCUMENTS

| | | |
|---|---|---|
| CN | 105452185 A | 3/2016 |
| CN | 107129160 A | 9/2017 |
| CN | 107810110 A | 3/2018 |
| CN | 107827367 A | 3/2018 |
| WO | 2018/143991 A1 | 8/2018 |
| WO | 2018/152021 A1 | 8/2018 |
| WO | 2018/182996 A1 | 10/2018 |
| WO | 2019/055745 A1 | 3/2019 |

OTHER PUBLICATIONS

International Search Report and Written Opinion of the International Searching Authority; PCT/2020/034768; dated Sep. 21, 2020; 9 Pages; European Patent Office.

Chinese Patent Application No. 202080040141.X, Office Action, dated Mar. 1, 2023, 4 pages, Chinese Patent Office.

* cited by examiner

TEXTURED GLASS ARTICLES AND METHODS OF MAKING THE SAME

CLAIM OF PRIORITY

This application is a continuation application of U.S. patent application Ser. No. 16/886,558, filed May 28, 2020, now U.S. Pat. No. 11,306,024, which claims the benefit of priority under 35 U.S.C. § 119 of U.S. Provisional Application No. 62/854,714, filed on May 30, 2019, the entire contents of each of these documents are hereby incorporated herein by reference for all purposes.

FIELD

The present disclosure generally relates to textured glass articles and methods of making the same, particularly textured glass articles with low sparkle characteristics and ion-exchange etching methods of making the same.

BACKGROUND

Antiglare surfaces are often used in display devices such as LCD screens, tablets, smartphones, OLEDs and touch screens to avoid or reduce specular reflection of ambient light. In many display devices, these antiglare surfaces are formed by providing a level of roughness to one or more surfaces of the glass to spread and scatter incident light. Antiglare surfaces in the form of a roughened glass surface are often used on the front surfaces of these display devices to reduce the apparent visibility of external reflections from the display and improve readability of the display under differing lighting conditions.

Display "sparkle" or "dazzle" is a phenomenon that can occur when antiglare or light scattering surfaces are incorporated into a display system. Sparkle is the expression of a non-uniform pixel light intensity distribution. Further, sparkle is associated with a very fine grainy appearance that can appear to have a shift in the pattern of the grains with changing viewing angle of the display. This type of sparkle is observed when pixelated displays, such as LCDs, are viewed through an antiglare surface. As the resolution of display devices continues to increase, particularly for hand-held electronic devices, the pixel pitch of the array of pixels employed in these devices continues to decrease, exacerbating unwanted sparkle effects.

Conventional approaches to making textured glass surfaces have been successful at producing some surfaces with good antiglare properties. However, these textured surfaces have exhibited high degrees of sparkle. Common surface treatments and other processes aimed at reducing sparkle tend to successfully reduce sparkle, but at the expense of antiglare properties, such as DOI. In addition, conventional etching approaches to developing textured surfaces with low sparkle have been unsuccessful in reliably obtaining surface features of less than 5 microns and sparkle levels of less than 1%. Moreover, conventional etching approaches frequently rely on etchants, such as HF, which can pose safety and environmental risks.

In view of these considerations, there is a need for textured glass surfaces and articles, including surfaces and articles with low sparkle characteristics. There is also a need for methods of making such surfaces and articles that are amenable to manufacturing at low cost with minimal safety and environmental risks.

SUMMARY

According to an aspect of the disclosure, a glass article is provided that includes: a glass substrate comprising a thickness and a primary surface; and a textured region defined by the primary surface. The textured region comprises a plurality of sub-surface hillocks, each hillock having a top surface and a base, the base located below the primary surface of the substrate. The plurality of hillocks comprises an average lateral feature size from 0.1 µm to 3 µm and an average height from 5 nm to 200 nm. Further, the primary surface of the substrate is substantially planar.

According to an aspect of the disclosure, a glass article is provided that includes: a glass substrate comprising a thickness and a primary surface; and a textured region defined by the primary surface. The textured region comprises a plurality of sub-surface hillocks, each hillock having a top surface and a base, the base located below the primary surface of the substrate. The plurality of hillocks comprises an average lateral feature size from 0.1 µm to 3 µm and an average height from 5 nm to 200 nm. In addition, the glass article comprises a sparkle of less than 1% as measured by pixel power distribution (PPD) with a 140 pixels per inch (PPI) light source. Further, the primary surface of the substrate is substantially planar.

According to another aspect of the disclosure, a method of making a glass article is provided that includes: providing a glass substrate comprising a thickness and a primary surface; and submerging the glass substrate in a molten etchant bath for an etching duration of 10 minutes to 1000 minutes, the etchant bath at an etching temperature from 350° C. to 500° C. The etchant bath comprises: (a) 30% to about 48% $KNO_3$ (or in a range of 0% to about 95% $KNO_3$); (b) 30% to about 48% $NaNO_3$ (or in a range of 0% to about 95% $NaNO_3$); (c) 3% to 10% $K_2CO_3$ or $Na_2CO_3$; and (d) 0.1% to 30% lithium salt. The submerging is conducted to form a textured region in the glass substrate, and the textured region comprises a plurality of sub-surface hillocks, each hillock having a top surface and a base, the base located below the primary surface of the substrate. Further, the primary surface of the substrate is substantially planar.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure as it is claimed.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
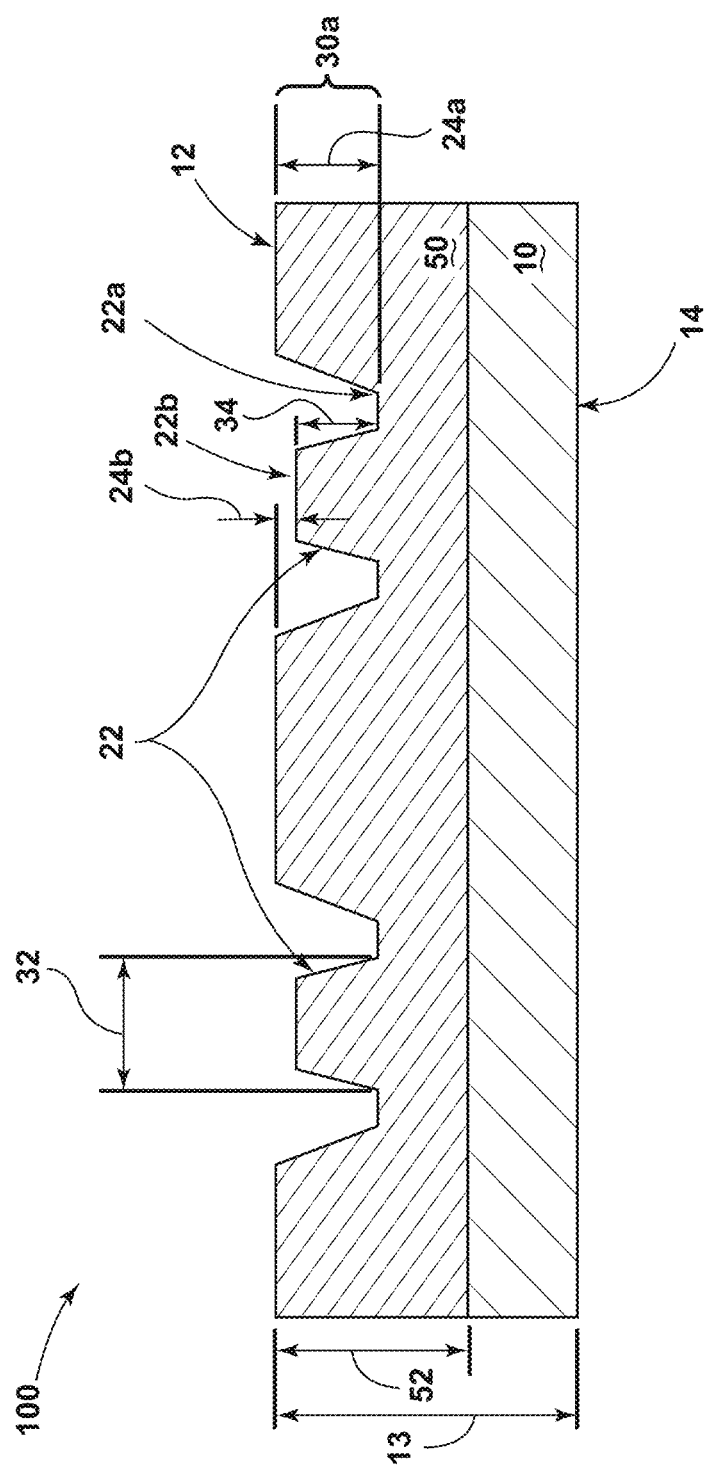
FIG. 1 is a cross-sectional, schematic view of a textured, antiglare glass article, according to an aspect of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

"Gloss," "gloss level," or like terms refer to, for example, surface luster, brightness, or shine, and more particularly to the measurement of specular reflectance calibrated to a standard (such as, for example, a certified black glass standard) in accordance with ASTM procedure D523, the contents of which are incorporated herein by reference in their entirety. Common gloss measurements are typically performed at incident light angles of 20°, 60°, and 85°, with the most commonly used gloss measurement being performed at 60°. Unless otherwise noted, the amount of gloss is reported in this disclosure with either of the following interchangeable designations under ASTM D523: "standard gloss units (SGU)" (i.e., "a gloss from 30 SGU to 100 SGU") or a unit-less number (i.e., a "gloss from 30 to 100").

As used herein, the terms "transmission haze" and "haze" refer to the percentage of transmitted light scattered outside an angular cone of about ±2.5° in accordance with ASTM procedure D1003, entitled "Standard Test Method for Haze and Luminous Transmittance of Transparent Plastics," the contents of which is incorporated by reference herein in its entirety. For an optically smooth surface, transmission haze is generally close to zero (i.e., 0%). Unless otherwise noted herein, haze values are reported in units of "%" to denote the percentage of haze measured according to ASTM D1003.

As used herein, the term "transmittance" is defined as the percentage of incident optical power within a given wavelength range transmitted through a material (e.g., the article, the substrate or the optical film or portions thereof). Unless otherwise noted herein, transmittance values are reported in units of "%" to denote the percentage of incident optical power measured through the material within a specified wavelength range. The term "reflectance" is similarly defined as the percentage of incident optical power within a given wavelength range that is reflected from a material (e.g., the article, the substrate, or the optical film or portions thereof). Reflectance may be measured as a single side reflectance (also referred herein as "first surface reflectance") when measured at the first primary surface of a substrate only of the article, such as through using index-matching oils on the back surface coupled to an absorber, or other known methods.

As used herein, the terms "pixel power deviation" and "PPD" refer to the quantitative measurement for display sparkle. Further, as used herein, the term "sparkle" is used interchangeably with "pixel power deviation" and "PPD." PPD is calculated by image analysis of display pixels according to the following procedure. A grid box is drawn around each LCD pixel. The total power within each grid box is then calculated from CCD camera data and assigned as the total power for each pixel. The total power for each LCD pixel thus becomes an array of numbers, for which the mean and standard deviation may be calculated. The PPD value is defined as the standard deviation of total power per pixel divided by the mean power per pixel (times 100). The total power collected from each LCD pixel by the eye simulator camera is measured and the standard deviation of total pixel power (PPD) is calculated across the measurement area, which typically comprises about 30×30 LCD pixels.

The details of a measurement system and image processing calculation that are used to obtain PPD values are described in U.S. Pat. No. 9,411,180 entitled "Apparatus and Method for Determining Sparkle," the salient portions of which that are related to PPD measurements are incorporated by reference herein in their entirety. Further, unless otherwise noted, the SMS-1000 system (Display-Messtechnik & Systeme GmbH & Co. KG) is employed to generate and evaluate the PPD measurements of this disclosure. The PPD measurement system includes: a pixelated source comprising a plurality of pixels (e.g., a Lenovo Z50 140 ppi laptop), wherein each of the plurality of pixels has referenced indices i and j; and an imaging system optically disposed along an optical path originating from the pixelated source. The imaging system comprises: an imaging device disposed along the optical path and having a pixelated sensitive area comprising a second plurality of pixels, wherein each of the second plurality of pixels are referenced with indices in and n; and a diaphragm disposed on the optical path between the pixelated source and the imaging device, wherein the diaphragm has an adjustable collection angle for an image originating in the pixelated source. The image processing calculation includes: acquiring a pixelated image of the transparent sample, the pixelated image comprising a plurality of pixels; determining boundaries between adjacent pixels in the pixelated image; integrating within the boundaries to obtain an integrated energy for each source pixel in the pixelated image; and calculating a standard deviation of the integrated energy for each source pixel, wherein the standard deviation is the power per pixel dispersion. As used herein, all "PPD" and "sparkle" values, attributes and limits are calculated and evaluated with a test setup employing a display device having a pixel density of 140 pixels per inch (PPI) (also referred herein as "$PPD_{140}$"). Further, unless otherwise noted herein, sparkle is reported in units of "%" to denote the percentage of sparkle observed on a display device having a pixel density of 140 pixels per inch.

Aspects of the disclosure generally pertain to textured glass articles and, particularly, textured glass articles with low sparkle. These glass articles have a textured region that includes a plurality of sub-surface hillocks, each hillock having a top surface and a base, the base located below the primary surface of the substrate. Aspects of the disclosure include methods of making these articles, which include etching the glass substrate with a molten etchant bath comprising a lithium salt. More generally, the approaches to preparing the textured glass articles of the disclosure generate a textured region with a plurality of hillocks, each hillock having an average lateral feature size of from 0.1 µm to 3 µm and an average height of from 5 nm to 200 nm.

Referring to FIG. 1, a textured glass article 100 is depicted as including a glass substrate 10 with a plurality of primary surfaces 12 and 14, and a thickness 13. The glass article 100 also includes a textured region 30a, as defined by the primary surface 12. In some embodiments, the textured region 30a is formed from or otherwise part of the substrate 10, as shown in FIG. 1. In some implementations (not shown), the textured region 30a is defined by the primary surface 14. Further, in some implementations, the textured region 30a is defined by both of the primary surfaces 12 and 14. According to implementations of the textured glass article 100 depicted in FIG. 1, each of the primary surfaces 12 and 14 of the substrate 10 is substantially planar. According to other implementations of the article 100, only one of the primary surfaces 12 and 14 of the substrate 10 is substantially planar (not shown).

As also depicted in FIG. 1, the textured region 30a includes a plurality of sub-surface hillocks 22. Each of these hillocks 22 includes a top surface 22b and a base 22a. The base 22a is located below the primary surface 12 of the substrate 10. As such, and unless otherwise noted, the term "sub-surface hillocks" in this disclosures refers to the base of each of the hillocks being located below the primary surface of the substrate that defines them. Further, according to some embodiments, the base 22a of each of the hillocks 22 is located at a distance 24a below the primary surface 12. In some implementations, the base 22a of each of the hillocks 22 defines a moat or moat-like feature in the primary surface 12 of the substrate 10. With regard to the top surface 22b of each of the hillocks 22, this surface can be located below the primary surface 12 of the substrate 10, as defined by a distance 24b as shown in FIG. 1. According to other implementations, the top surface 22b of one or more of the hillocks can be substantially planar with the primary surface 12 of the substrate. In additional implementations, the top surface 22b of one or more of the hillocks 22 is located above the primary surface 12 of the substrate 10.

According to embodiments of the textured glass articles 100, the hillocks of the plurality of hillocks 22 have a mesa-like appearance with a base 22a that is substantially round in shape with a top surface 22b that is substantially planar. In other implementations, the hillocks 22 are less regular in shape, with one or more of the base 22a and top surface 22b having a less regular shape. Further, according to some implementations, the hillocks can be characterized by a pyramidal shape with a base 22a that is square in shape and a top surface 22b that defines a sharp or rounded tip-like feature.

Referring again to FIG. 1, the plurality of hillocks 22 of the textured glass article 100 can be defined by an average lateral feature size 32 and an average height 34. According to embodiments of the textured glass article 100, the average lateral feature size 32 of the hillocks is larger than the average height 34. In some implementations, the average lateral feature size 32 is larger than the average height 34 by a factor of 1, 1.5, 2, 2.5, 3, 3.5, 4, 4.5, 5, 6, 7, 8, 9, 10, 15, 20, 30, 40, 50, 60, 70, 80, 90, 100, 200, 300, 400, 500, 600, 700, 800, 900, 1000, 1500, 2000, 2500, 3000, 3500, 4000, 4500, 5000, 5500, 6000, 6500, 7000, 7500, 8000, 8500, 9000, 9500, 10000 and all factors between these values.

According to some implementations of the textured glass article 100 depicted in FIG. 1, the plurality of hillocks 22 of the textured region 30a, including their average lateral feature size 32 and average height 34, are configured to reduce the level of sparkle associated with the article when it is employed in a display device. Each of the average lateral feature size 32 and average height 34 of the plurality of hillocks 22 is given by an average of the lateral feature sizes and heights of a sampling of the hillocks 22 within the textured region 30a, as measured according to analytical and statistical sampling techniques understood by those with ordinary skill in the field of this disclosure. With regard to analytical techniques, those with ordinary skill in the field of the disclosure may employ one or more analytical instruments to measure the average lateral feature size 32 and the average height 34, e.g., an atomic force microscope (AFM) for particularly small features (e.g., <10 µm). With regard to statistical techniques, one with ordinary skill may obtain the average lateral feature size 32 and average height 34 by taking an image of the primary surface 12 and measuring the maximum dimension of a sampling of at least ten (10) features. In other instances, larger sample sizes can be employed, as judged appropriate by those skilled in the field of the disclosure to obtain statistically significant results. Accordingly, the terms "average lateral feature size" and "average height" of the plurality of hillocks 22 are used interchangeably in the disclosure with the terms "average maximum lateral feature size" and "average maximum height", or like terms.

In embodiments of the textured glass article 100 shown in FIG. 1, the average lateral feature size 32 of the plurality of hillocks 22 is greater than or equal to about 0.01 µm. In some implementations, the average lateral feature size 32 can be from 0.01 µm to 20 µm, 0.01 µm to 10 µm, 0.1 µm to 10 µm, 0.1 µm to 5 µm, 0.1 µm to 3 µm, 0.2 µm to 2 µm, or any lateral feature sizes or sub-ranges within these ranges. For example, the average lateral feature size 32 of the plurality of hillocks 22 can be 0.01 µm, 0.05 µm, 0.1 µm, 0.2 µm, 0.3 µm, 0.4 µm, 0.5 µm, 1 µm, 1.5 µm, 2 µm, 2.5 µm, 3 µm, 4 µm, 5 µm, 6 µm, 7 µm, 8 µm, 9 µm, 10 µm, 15 µm, 20 µm, and all lateral feature sizes within these lateral sizes.

According to some embodiments of the textured glass article 100 shown in FIG. 1, the average height 34 of the plurality of hillocks 22 is greater than or equal to about 1 nm. In some implementations, the average height 34 can be from 1 nm to 10000 nm, 1 nm to 5000 nm, 1 nm to 1000 nm, 5 nm to 5000 nm, 5 nm to 1000 nm, 5 nm to 200 nm, or any average height or sub-range within these ranges. For example, the average height 34 of the plurality of hillocks 22 can be 1 nm, 2 nm, 3 nm, 4 nm, 5 nm, 6 nm, 7 nm, 8 nm, 9 nm, 10 nm, 20 nm, 30 nm, 40 nm, 50 nm, 60 nm, 70 nm, 80 nm, 90 nm, 100 nm, 125 nm, 150 nm, 175 nm, 200 nm, 300 nm, 400 nm, 500 nm, 600 nm, 700 nm, 800 nm, 900 nm, 1000 nm, 2000 nm, 3000 nm, 4000 nm, 5000 nm, 7500 nm, 10000 nm, and all average heights within these average height values.

According to implementations of the textured glass article 100 depicted in FIG. 1, the article is characterized by a low level of sparkle. In general, the roughness associated with its exposed features of these articles can begin to act like a plurality of lenses that generates an image artifact called "sparkle". Display "sparkle" or "dazzle" is a generally undesirable side effect that can occur when introducing antiglare or light scattering surfaces into a pixelated display system such as, for example, an LCD, an OLED, touch screens, or the like, and differs in type and origin from the type of "sparkle" or "speckle" that has been observed and characterized in projection or laser systems. Sparkle is associated with a very fine grainy appearance of the display, and may appear to have a shift in the pattern of the grains with changing viewing angle of the display. Display sparkle may be manifested as bright and dark or colored spots at approximately the pixel-level size scale.

As generally depicted in FIG. 1, the textured region 30a of the textured glass article 100 can be configured to minimize sparkle. In some embodiments, the textured region 30a is configured to minimize sparkle, while maintaining a reduced glare function (e.g., with regard to DOI, as outlined in greater detail later in this disclosure) suitable for display device applications. According to some embodiments, the textured region 30a of the textured glass article 100 is configured such that the article is characterized by a sparkle of 1% or less, as measured by a PPD distribution. In other aspects, the textured glass articles 100 of the disclosure can be configured with a sparkle of 1% or less, 0.9% or less, 0.8% or less, 0.7% or less, 0.6% or less, 0.5% or less, 0.4% or less, 0.3% or less, 0.2% or less, 0.1% or less, and all sparkle levels and sparkle sub-ranges between these upper limits, as measured by a PPD distribution. For example, the textured glass article 100 can have a sparkle of 1%, 0.75%, 0.5%, 0.25%, 0.1%, 0.075%, 0.05%, 0.025%, and all sparkle levels between these values.

Referring again to the textured glass article 100 depicted in FIG. 1, the article can also be configured for optimal antiglare performance, as manifested by low distinctness of image (DOI) values. As used herein, "DOI" is equal to $100*(R_s-R_{0.3}°)/R_s$, where $R_s$ is the specular reflectance flux measured from incident light (at 30° from normal) directed onto a textured region 30a of a textured glass article of the disclosure and $R_{0.3}°$ is the reflectance flux measured from the same incident light at 0.3° from the specular reflectance flux, $R_s$. Unless otherwise noted, the DOI values and measurements reported in this disclosure are obtained according to the ASTM D5767-18 Standard Test Method for Instrumental Measurement of Distinctness-of-Image (DOI) Gloss of Coated Surfaces using a Rhopoint IQ Gloss Haze & DOI Meter (Rhopoint Instruments Ltd.). Notably, the textured glass articles 100 of the disclosure can exhibit low sparkle (e.g., less than 1%) without significant reductions in antiglare performance, as manifested in low DOI values. In implementations, the textured glass articles 100 of the disclosure are believed to exhibit a DOI of 99.5% or less. In other embodiments, the textured glass articles 100 of the disclosure are believed to exhibit a DOI of less than 99.5%, 99%, 95%, 90%, 85%, 80%, 75%, 70%, and all DOI levels between these upper limits.

According to implementations of the textured glass articles 100 depicted in FIG. 1, the articles can be characterized by a haze of 30% or less. In other implementations, for particular applications, textured glass articles 100 consistent with the principles of this disclosure can be fabricated with haze levels up to 90%. In further implementations, the textured glass articles 100 can be characterized with haze levels ranging from 3% to 90%, from 3% to 30%, from 1% to 90%, from 3% to 30%, from 1% to 10%, from 0.1% to 100%, from 0.1% to 30%, from 0.1% to 10%, from 0.02% to 0.1%, and all haze levels and haze sub-ranges between these haze ranges.

According to implementations of the textured article 100 depicted in FIG. 1, the article can be characterized with a gloss of from about 30 to 100, 30 to 90, 40 to 100, 40 to 90, 50 to 100, 50 to 90, and all gloss values and gloss sub-ranges between these gloss levels, as measured at a 20° incident angle. According to implementations of the textured article 100 depicted in FIG. 1, the article can be characterized with a gloss of from about 50 to 150, 50 to 120, 60 to 150, 60 to 120, 70 to 150, 70 to 120, and all gloss values and gloss sub-ranges between these gloss levels, as measured at a 60° incident angle. According to implementations of the textured article 100 depicted in FIG. 1, the article can be characterized with a gloss (as measured under ASTM D523) of from about 50 to 150, 50 to 120, 60 to 150, 60 to 120, 70 to 150, 70 to 120, 90 to 150, 90 to 120, and all gloss values and gloss sub-ranges between these gloss levels, as measured at a 85° incident angle In one or more embodiments, the average light transmittance of the textured glass article 100 depicted in FIG. 1 can be at least 70%, 75%, 80%, 85%, 90%, 95%, or any transmittance level or range at or above these transmittance levels, as measured in the visible spectrum from about 400 nm to about 800 nm. For example, the average light transmittance of the glass article 100 can be 70%, 75%, 80%, 85%, 90%, 91%, 92%, 93%, 94%, 95%, 96%, 97%, 98%, 99%, or any transmittance level between these transmittance levels, as measured in the visible spectrum from about 400 nm to about 800 nm.

Referring again to FIG. 1, the glass substrate 10 of the textured glass article 100 can be configured with a multi-component glass composition having about 40 mol % to 80 mol % silica and a balance of one or more other constituents, e.g., alumina, calcium oxide, sodium oxide, boron oxide, etc. In some implementations, the bulk composition of the glass substrate 10 is selected from the group consisting of aluminosilicate glass, a borosilicate glass and a phosphosilicate glass. In other implementations, the bulk composition of the glass substrate 10 is selected from the group consisting of aluminosilicate glass, a borosilicate glass, a phosphosilicate glass, a soda lime glass, an alkali aluminosilicate glass, and an alkali aluminoborosilicate glass. In further implementations, the glass substrate 10 is a glass-based substrate, including but not limited to, glass-ceramic materials that comprise a glass component at about 90% or greater by weight and a ceramic component.

In one embodiment of the textured glass article 100 depicted in FIG. 1, the glass substrate 10 has a bulk composition that comprises an alkali aluminosilicate glass that comprises alumina, at least one alkali metal and, in some embodiments, greater than 50 mol %, $SiO_2$, in other embodiments, at least 58 mol %, and in still other embodiments, at least 60 mol % $SiO_2$, wherein the ratio ($Al_2O_3$ (mol %)+$B_2O_3$ (mol %))/Σ alkali metal modifiers (mol %)>1, where the modifiers are alkali metal oxides. This glass, in particular embodiments, comprises, consists essentially of, or consists of: about 58 mol to about 72 mol % $SiO_2$; about 9 mol % to about 17 mol % $Al_2O_3$; about 2 mol % to about 12 mol % $B_2O_3$; about 8 mol % to about 16 mol % $Na_2O$; and 0 mol to about 4 mol % $K_2O$, wherein the ratio ($Al_2O_3$ (mol %)+$B_2O_3$ (mol %))/Σ alkali metal modifiers (mol %)>1, where the modifiers are alkali metal oxides.

In another embodiment of the textured glass article 100, as shown in FIG. 1, the glass substrate 10 has a bulk composition that comprises an alkali aluminosilicate glass comprising, consisting essentially of, or consisting of: about 61 mol % to about 75 mol % $SiO_2$; about 7 mol to about 15 mol % $Al_2O_3$; 0 mol % to about 12 mol % $B_2O_3$; about 9 mol % to about 21 mol % $Na_2O$; 0 mol % to about 4 mol % $K_2O$; 0 mol % to about 7 mol MgO; and 0 mol % to about 3 mol % CaO.

In yet another embodiment, the glass substrate 10 has a bulk composition that comprises an alkali aluminosilicate glass comprising, consisting essentially of, or consisting of: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$; 0 mol % to about 20 mol % $Na_2O$; 0 mol % to about 10 mol % $K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$; and less than about 50 ppm $Sb_2O_3$; wherein 12 mol % ≤ $Li_2O$+$Na_2O$+$K_2O$ ≤ 20 mol % and 0 mol % ≤ MgO+CaO ≤ 10 mol %.

In still another embodiment, the glass substrate 10 has a bulk composition that comprises an alkali aluminosilicate glass comprising, consisting essentially of, or consisting of: about 64 mol % to about 68 mol % $SiO_2$; about 12 mol % to about 16 mol % $Na_2O$; about 8 mol % to about 12 mol % $Al_2O_3$; 0 mol % to about 3 mol % $B_2O_3$; about 2 mol % to about 5 mol % $K_2O$; about 4 mol % to about 6 mol % MgO; and 0 mol % to about 5 mol % CaO, wherein: 66 mol % ≤ $SiO_2$+$B_2O_3$+CaO ≤ 69 mol %; $Na_2O$+$K_2O$+$B_2O_3$+MgO+CaO+SrO > 10 mol %; 5 mol % ≤ MgO+CaO+SrO ≤ 8 mol %; ($Na_2O$+$B_2O_3$)—$Al_2O_3$ ≤ 2 mol %; 2 mol % ≤ $Na_2O$—$Al_2O_3$ ≤ 6 mol %, and 4 mol % ≤ ($Na_2O$+$K_2O$)—$Al_2O_3$ ≤ 10 mol %.

In other embodiments, the glass substrate 10 has a bulk composition that comprises $SiO_2$, $Al_2O_3$, $P_2O_5$, and at least one alkali metal oxide ($R_2O$), wherein 0.75>[($P_2O_5$ (mol %)+$R_2O$ (mol %))/$M_2O_3$ (mol %)] ≤ 1.2, where $M_2O_3$=$Al_2O_3$+$B_2O_3$. In some embodiments, [($P_2O_5$ (mol %)+$R_2O$ (mol %))/$M_2O_3$ (mol %)]=1 and, in some embodiments, the glass does not include $B_2O_3$ and $M_2O_3$=$Al_2O_3$. The glass substrate comprises, in some embodiments; about 40 to about 70 mol % $SiO_2$; 0 to about 28 mol % $B_2O_3$; about 0 to about 28 mol % $Al_2O_3$; about 1 to about 14 mol % $P_2O_5$; and about 12 to about 16 mol % $R_2O$. In some embodiments, the glass substrate comprises: about 40 to about 64 mol % $SiO_2$; 0 to about 8 mol % $B_2O_3$; about 16 to about 28 mol % $Al_2O_3$; about 2 to about 12 mol % $P_2O_5$; and about 12 to about 16 mol % $R_2O$. The glass substrate 10 may further comprise at least one alkaline earth metal oxide such as, but not limited to, MgO or CaO.

In some embodiments, the glass substrate 10 has a bulk composition that is substantially free of lithium; i.e., the glass comprises less than 1 mol % $Li_2O$ and, in other embodiments, less than 0.1 mol % $Li_2O$ and, in other embodiments, 0.01 mol % $Li_2O$, and in still other embodiments, 0 mol % $Li_2O$. In some embodiments, such glasses are free of at least one of arsenic, antimony, and barium; i.e., the glass comprises less than 1 mol % and, in other embodiments, less than 0.1 mol %, and in still other embodiments, 0 mol % of $As_2O_3$, $Sb_2O_3$, and/or BaO.

In other embodiments of the textured glass article 100 depicted in FIG. 1, the glass substrate 10 has a bulk composition that comprises, consists essentially of or consists of a glass composition Corning® Eagle XG® glass, Corning® Gorilla@ glass, Corning® Gorilla@ Glass 2, Corning® Gorilla@ Glass 3, Corning® Gorilla@ Glass 4 or Corning® Gorilla@ Glass 5. In some implementations of the textured glass article 100 depicted in FIG. 1, the glass substrate 10 can have any of the following compositions denoted as "Glass A", "Glass B", "Glass C", "Corning® Eagle XG® Glass" or "Corning® Gorilla@ Glass 5". Glass A has the following composition (given in mol %): 63.65% $SiO_2$; 16.19% $Al_2O_3$; 2.67% $P_2O_5$; 0.38% $B_2O_3$; 0.33% MgO; 8.07% $Li_2O$; 8.11% $Na_2O$; 0.52% $K_2O$; 0.05% $SnO_2$; and 0.02% $Fe_2O_3$. Glass B has the following composition (given in mol %): 63.59% $SiO_2$; 15.07% $Al_2O_3$; 2.51% $P_2O_5$; 2.40% $B_2O_3$; 5.95% $Li_2O$; 9.26% $Na_2O$; 0.04% $SnO_2$; and 1.18% ZnO. Glass C has the following composition (given in mol %): 70.6% $SiO_2$; 12.7% $Al_2O_3$; 2% $B_2O_3$; 8.2% $Li_2O$; 2.4% $Na_2O$; 2.9% MgO; 0.05% $SnO_2$; and 0.9% ZnO. Corning® Eagle XG® glass has the following composition (given in mol %): 67.71% $SiO_2$; 11.03% $Al_2O_3$; 9.65% $B_2O_3$; 2.26% MgO; 8.81% CaO; and 0.54% SrO. Corning® Gorilla® Glass 5 has the following composition (given in mol %): 63.63% $SiO_2$; 15.64% $Al_2O_3$; 2.47% $P_2O_5$; 6.22% $Li_2O$; 10.82% $Na_2O$; 0.07% $SnO_2$; and 1.16% ZnO.

According to other embodiments, the glass substrate 10 of the textured glass article 100 depicted in FIG. 1 can possess an ion-exchangeable glass composition that is strengthened by either chemical or thermal means that are known in the art. In one embodiment, the glass substrate is chemically strengthened by ion exchange. In this process, metal ions at or near a primary surface 12 and/or primary surface 14 of the glass substrate 10 are exchanged for larger metal ions having the same valence as the metal ions in the glass substrate. The exchange is generally carried out by contacting the glass substrate 10 with an ion exchange medium such as, for example, a molten salt bath that contains the larger metal ion. The metal ions are typically monovalent metal ions such as, for example, alkali metal ions. In one non-limiting example, chemical strengthening of a glass substrate 10 that contains sodium ions by ion exchange is accomplished by immersing the glass substrate 10 in an ion exchange bath comprising a molten potassium salt such as potassium nitrate ($KNO_3$) or the like (e.g., during the etching step 406 of the method 400 shown in FIG. 4 and described below). In one particular embodiment, the ions in the surface layer of the glass substrate 10 and the larger ions are monovalent alkali metal cations, such as $Li^+$ (when present in the glass), $Na^+$, $K^+$, $Rb^+$, and $Cs^+$. Alternatively, monovalent cations in the surface layer of the glass substrate 10 may be replaced with monovalent cations other than alkali metal cations, such as $Ag^+$ or the like.

In these embodiments of the textured glass article 100 depicted in FIG. 1, the replacement of small metal ions by larger metal ions in the ion exchange process creates a compressive stress region 50 in the glass substrate 10 that extends from the primary surface 12 to a depth 52 (referred to as the "depth of layer") that is under compressive stress. It should also be understood that a compressive stress region can be formed in the glass substrate that extends from the primary surface 14 to a depth (not shown in FIG. 1) that is comparable in nature to the compressive stress region 50. More particularly, this compressive stress at the primary surface of the glass substrate is balanced by a tensile stress (also referred to as "central tension") within the interior of the glass substrate. In some embodiments, the primary surface 12 of the glass substrate 10 described herein, when strengthened by ion exchange, has a compressive stress of at least 200 MPa (i.e., a minimum compressive stress (CS)), and the region under compressive stress extends to a depth 52, i.e., depth of compression (DOC), from 5 μm to 200 μm below the primary surface 12. According to some embodiments of the textured glass article 100, the compressive stress region 50 has a minimum CS of 100 MPa, 150 MPa, 200 MPa, 250 MPa, 300 MPa, 350 MPa, 400 MPa, 450 MPa, 500 MPa, 600 MPa, 700 MPa, 800 MPa, 900 MPa, 1000 MPa, or any minimum CS value between levels. Further, according to some implementations of the textured glass article 100, the compressive stress region 50 extends to a depth 52 such that it can be characterized with a DOC of from 1 μm to 300 μm, 1 μm to 200 μm, 5 μm to 300 μm, 5 μm to 200 μm, 5 μm to 100 μm, and all DOC values and sub-ranges between these DOC ranges.

With further regard to the textured glass article 100 depicted in FIG. 1, ion exchange processes can be carried out by immersing the glass substrate 10 in a molten salt bath containing the larger ions to be exchanged with the smaller ions in the glass. As will be noted in further detail below, methods of the disclosure (see, e.g., method 400 of making a glass article depicted in FIG. 4) include the development of the textured region 30a as part of the ion exchange process. Further, it will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined based on the composition of the glass, desired depth of layer, desired compressive stress level and the particular attributes desired in the textured region. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 16 hours. However, temperatures and immersion times different from those described above may also be used. Such ion exchange treatments, when employed with a glass substrate 10 having an alkali aluminosilicate glass composition, can result in a compressive stress region 50 having a depth 52 (depth of layer) ranging from about 10 μm up to at least 50 μm with a compressive stress ranging from about 200 MPa up to about 1000 MPa, and a central tension of less than about 100 MPa.

According to another implementation of the textured glass article 100 depicted in FIG. 1, the article can further include an easy-to-clean (ETC) coating (not shown) disposed over the textured region 30a. In most embodiments, the ETC coating is deposited over the textured region 30a such that its surface morphology generally mirrors the underlying morphology of the textured region 30a. In one embodiment, the textured glass article 100 further includes a smudge-resistant fluorine-based ETC coating, deposited on at least a portion of the textured region 30a. In embodiments, the ETC coating comprises at least one amphiphobic substance having fluorine termination groups provide the textured region 30a with amphiphobicity (i.e., hydrophobicity and oleophobicity, or lack of affinity for both oils and water), thus minimizing wetting of the surface by water and/or oils. The fluorine termination groups of the ETC coating are less polar than a surface having —OH termination groups, and therefore minimize hydrogen (i.e., Van der Waals) bonding between particles and liquids. For fingerprint oils and debris associated with fingerprints, bonding—and adhesion—is minimized. Consequently, mass transport of fingerprint oils and debris from the finger of a person to the ETC coating is minimized. In one embodiment, the ETC coating is formed by exchanging the hydrogen found in terminal OH groups on the textured region 30a of the textured glass article 100 with a fluorine-based moiety such as, for example, a fluorine-containing monomer (e.g., a fluorosilane), to form a glass having terminal fluorinated groups.

In another embodiment, an ETC coating of the textured glass article 100 depicted in FIG. 1 comprises a self-assembled monolayer of a fluorine-terminating molecular chain. In yet another embodiment, the ETC coating comprises a thin, fluoro-polymeric coating and, in yet another embodiment, the ETC coating comprises silica soot particles that have been treated to have pendent fluorocarbon groups attached to the soot particles. Such ETC coatings can be applied to the textured region 30a of the textured glass article 100 by dipping, vapor coating, spraying, application with a roller, or another suitable method known in the art. After the ETC coating has been applied, it may be "cured" at temperatures ranging from about 25° C. up to about 150° C. and, in another embodiment, at temperatures ranging from about 40° C. up to about 100° C. Curing times can range from about 1 up to about 4 hours, and may be carried out in an atmosphere containing 40-95% moisture. After curing, the textured glass articles 100 with an ETC coating can be solvent-rinsed to remove any unbound coating and air-dried prior to use.

Figure 2A:
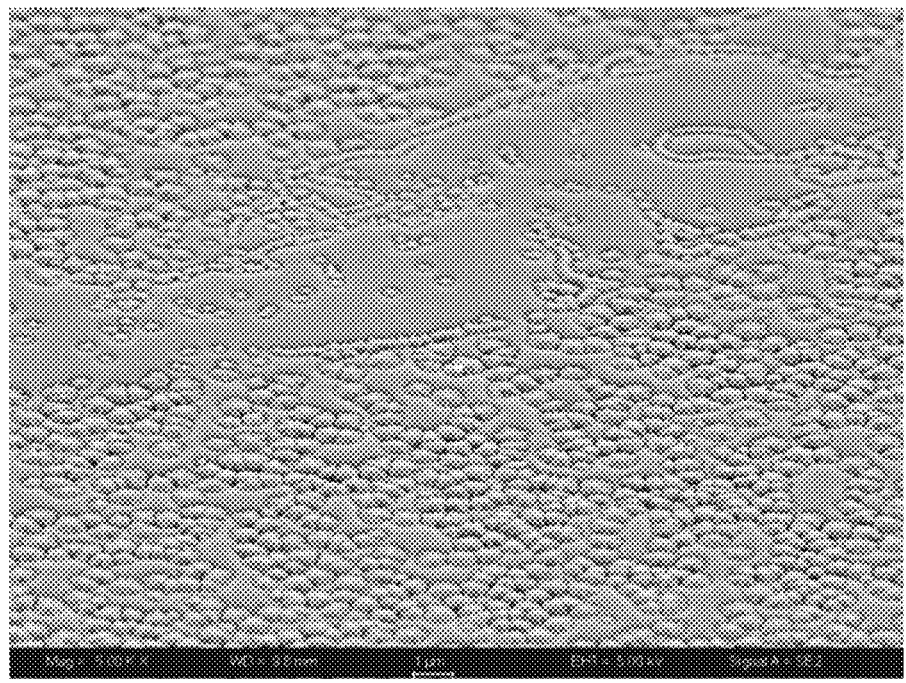
FIG. 2A is a scanning electron microscope (SEM) image of a textured glass article, according to an aspect of the disclosure.
Figure 2B:
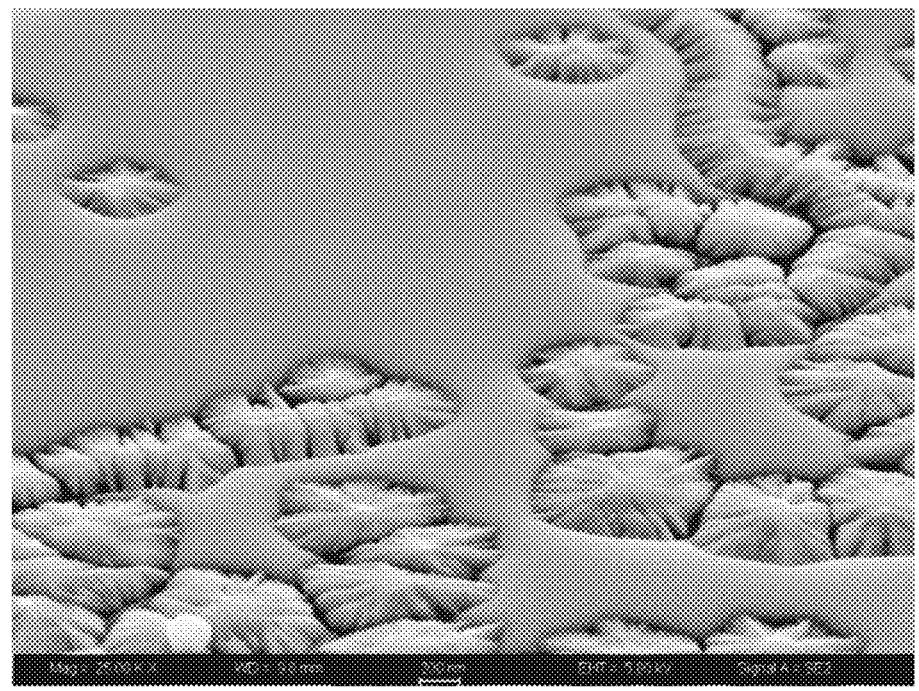
FIG. 2B is an enlarged portion of the SEM image depicted in FIG. 2A.

Referring now to FIG. 2A, a scanning electron microscope (SEM) image with a scale of 1 μm is provided of a textured glass article, as consistent with the textured glass article 100 depicted in FIG. 1. Further, FIG. 2B is a selected portion of the SEM image depicted in FIG. 2A, as enlarged by 5× with a scale of about 200 nm. As is evident from FIGS. 2A and 2B, the textured glass article includes a textured region defined by a primary surface of the substrate. Further, the textured region includes a plurality of sub-surface hillocks distributed randomly along the primary surface of the substrate. Each of these hillocks has an average lateral feature size of 2 μm or less. As is also evident from these figures, each of the sub-surface hillocks has a top surface and a base (i.e., at the bottom of each hillock). In the embodiment depicted in FIGS. 2A and 2B, the top surface of each of the sub-surface hillocks is below the primary surface of the substrate.

Figure 3A:
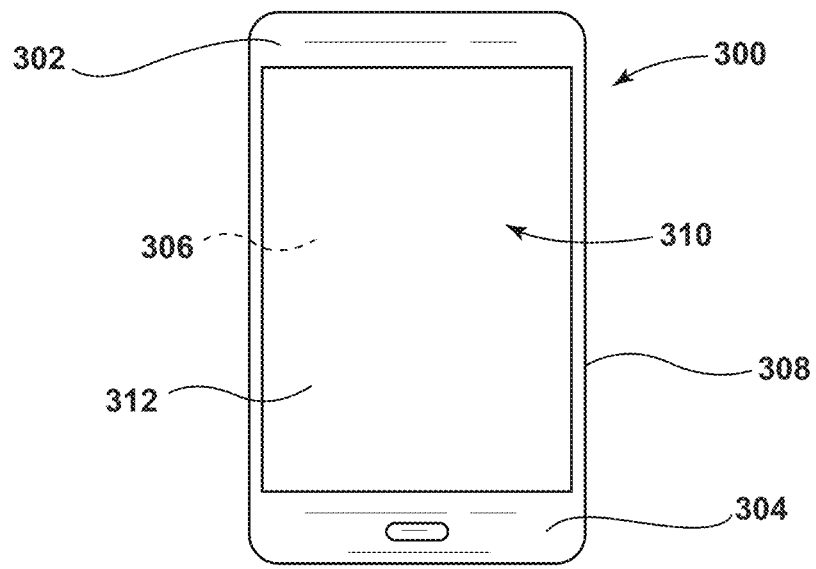
FIG. 3A is a plan view of an exemplary electronic device incorporating any of the articles of the disclosure.
Figure 3B:
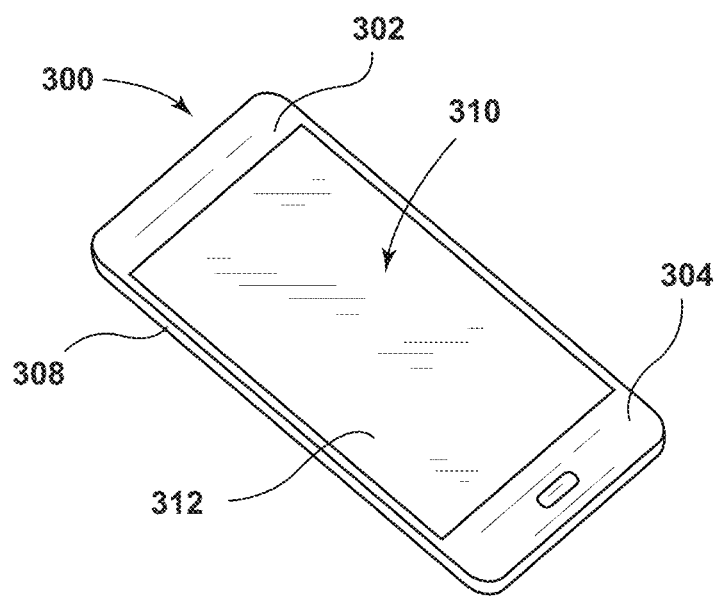
FIG. 3B is a perspective view of the exemplary electronic device of FIG. 3A.

Referring now to FIGS. 3A and 3B, the textured glass articles 100 disclosed herein (see FIG. 1) may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass articles disclosed herein, including textured glass articles 100, is shown in FIGS. 3A and 3B. Specifically, FIGS. 3A and 3B show a consumer electronic device 300 including a housing 302 having front 304, back 306, and side surfaces 308; electrical components (not shown) that are at least partially inside or entirely within the housing and including at least a controller, a memory, and a display 310 at or adjacent to the front surface of the housing; and a cover substrate 312 at or over the front surface of the housing such that it is over the display. In some embodiments, at least one of the cover substrate 312 or a portion of housing 302 may include any of the glass articles disclosed herein (e.g., the textured glass articles 100 depicted in FIG. 1).

Figure 4:
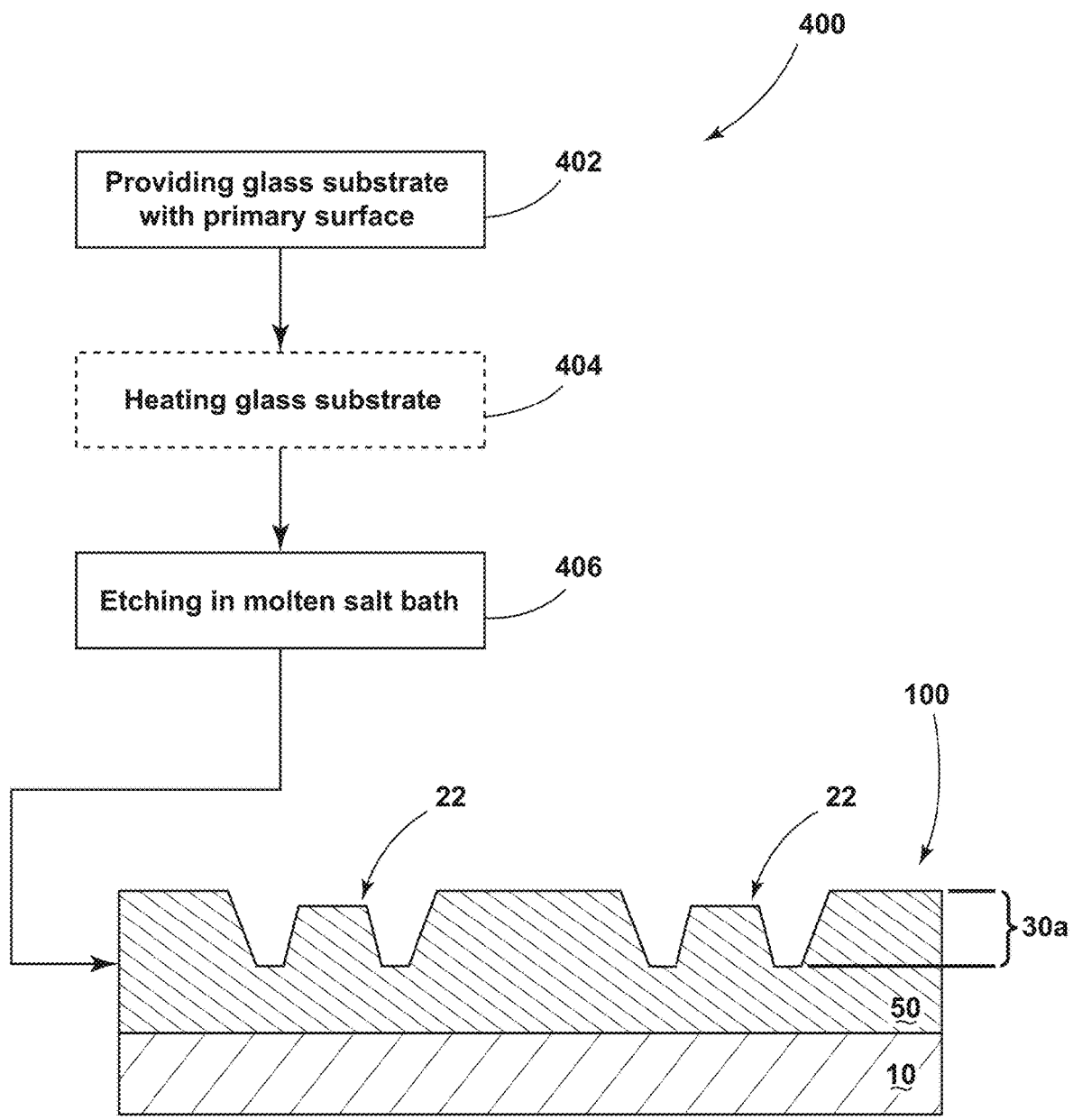
FIG. 4 is a flow chart schematic of a method of making a textured glass article, according to an aspect of the disclosure.
Figure 5A:
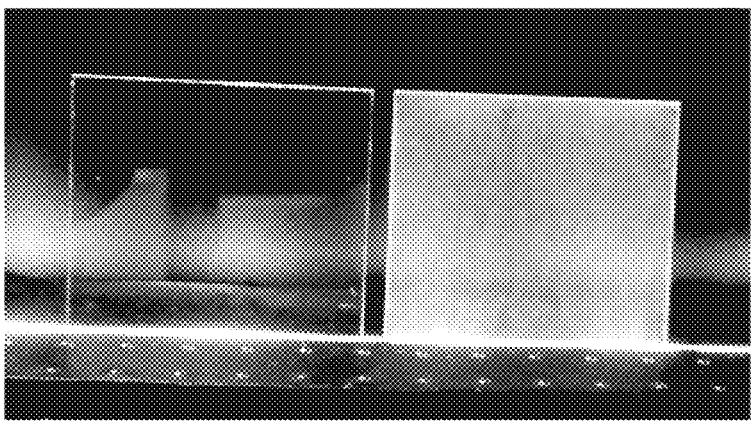
FIGS. 5A-5D are photographs of textured glass articles having four glass compositions, respectively, as etched in molten salt baths containing lithium ions and no lithium ions, according to aspects of the disclosure.
Figure 5B:
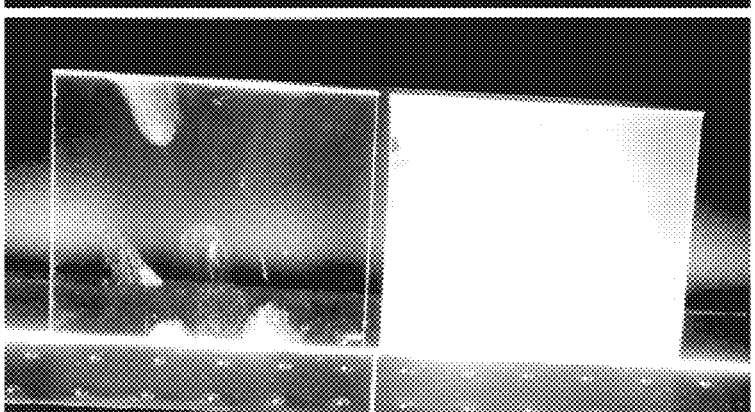
Figure 5C:
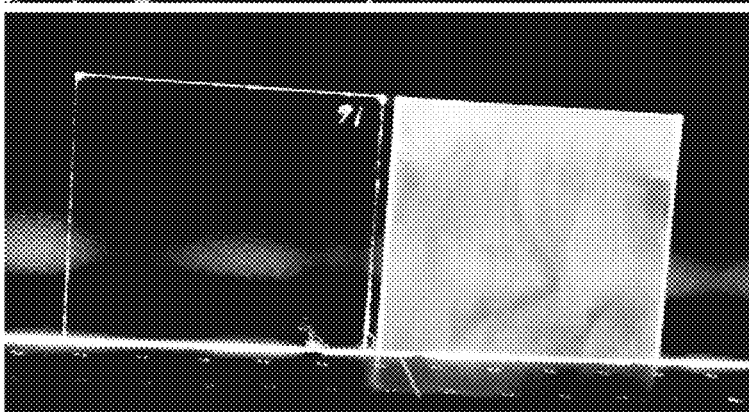
Figure 5D:
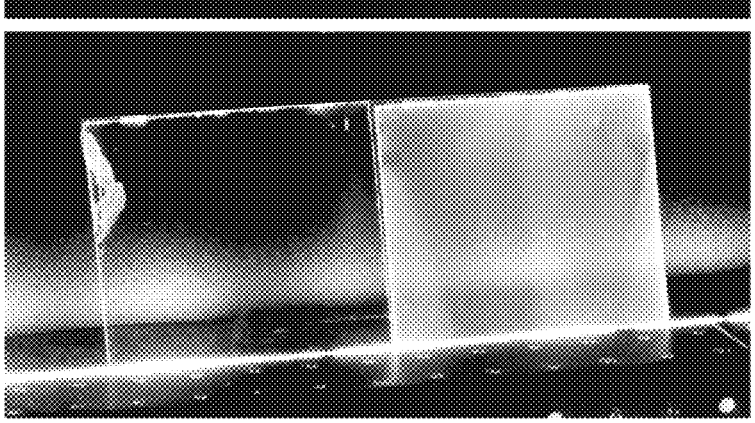

Referring now to FIG. 4, a schematic flow chart is provided that depicts a method 400 of making a textured glass article, e.g., a textured glass article 100 (as depicted in FIG. 1). Unless otherwise noted, the like-numbered elements of the textured glass article 100 depicted in FIGS. 1 and 4 have the same or substantially similar functions and structures. As shown in FIG. 4, the method 400 includes a step 402 of providing a glass substrate with a primary surface (e.g., glass substrate 10 with primary surfaces 12, 14, as shown in FIG. 1). As further shown in FIG. 4, the method 400 can include an optional step 404 of heating the glass substrate, prior to the step 406 of etching the substrate (described in detail below). In some embodiments of the method 400, the optional step 404 of heating the substrate is conducted by heating the substrate to a temperature between 200° C. and the etching temperature employed in the subsequent step 406 of etching the substrate, e.g., from 350° C. to 500° C. For example, the optional step 404 can be conducted by heating the substrate to 200° C., 250° C., 300° C., 350° C., 400° C., 450° C., 500° C., and all temperatures and temperature sub-ranges between these temperature values. Typically, optional step 404 is conducted for a time sufficient to uniformly heat the glass substrate to the specified temperature. In some aspects, the step 404 of heating the substrate is conducted by heating the substrate to a temperature between 300° C. and the subsequent etching temperature, from 350° C. to 500° C.

Referring again to the method 400 of making a textured glass article, as depicted in FIG. 4, the method also includes a step 406 of etching (or otherwise submerging) the glass substrate in a molten etchant bath for an etching duration at an etching temperature. In embodiments of the method 400, the etching duration is from 10 minutes to 1000 minutes and the etching temperature is from 350° C. to 500° C. For example, step 406 can be conducted at an etching temperature of 350° C., 375° C., 400° C., 425° C., 450° C., 475° C., 500° C., and all temperatures and temperature sub-ranges between these temperature values; and an etching duration of 10 minutes, 50 minutes, 100 minutes, 150 minutes, 200 minutes, 250 minutes, 300 minutes, 400 minutes, 500 minutes, 600 minutes, 700 minutes, 800 minutes, 900 minutes, 1000 minutes, and all etching durations and duration sub-ranges between these etching duration values. According to some embodiments of the method 400, step 406 is conducted with an etching temperature from 360° C. to 400° C. and an etching duration of from 20 minutes to 100 minutes.

In some implementations of the method 400 depicted in FIG. 4, the molten etchant bath of step 406 is a molten salt bath. Further, the molten salt bath can include (by weight): (a) 30% to about 48% $KNO_3$; (b) 30% to about 48% $NaNO_3$; (c) 3% to 10% $K_2CO_3$ or $Na_2CO_3$; and (d) 0.1% to 30% lithium salt. In addition, step 406 is conducted to form a textured region in the glass substrate (e.g., textured region 30a in the glass substrate 10), with the textured region comprising a plurality of sub-surface hillocks (e.g., sub-surface hillocks 22 shown in FIGS. 1 and 4). Each of the sub-surface hillocks includes a top surface and a base, the base located below the primary surface of the substrate. In addition, the primary surface of the substrate is substantially planar. In some implementations of the method 400 shown in FIG. 4, the completion of steps 402 and 406 (with or without optional step 404) yields a textured glass article consistent with the textured glass article 100 depicted in FIG. 1, and as described earlier.

Referring again to FIG. 4, the step 406 of etching the glass substrate according to the method 400 can employ a molten etchant bath with suitable compositions. As noted earlier, the molten etchant bath can include (by weight): (a) 30% to about 48% $KNO_3$ (e.g., a neutral salt having a pH between 7 and 9); (b) 30% to about 48% $NaNO_3$ (e.g., a neutral salt having a pH between 7 and 9); (c) 3% to 10% $K_2CO_3$, $Na_2CO_3$, $LiCO_3$, $K_3PO_4$, $Na_3PO_4$, $Li_3PO_4$, KOH, NaOH, and/or LiOH (e.g., salts having a pH of greater than 9); and (d) 0.1% to 30% lithium salt. In some implementations, the lithium salt can be selected from the group consisting of $LiNO_3$, $Li_2CO_3$, $Li_2SO_4$ and LiCl. In some implementations, either or both of the neutral salts of the molten etching bath, (a) $KNO_3$ and (b) $NaNO_3$, can be completely or partially substituted with one or more of $LiNO_3$, $K_2SO_4$, $Na_2SO_4$, $Li_2SO_4$, KCl, NaC and/or LiCl. In some implementations of the method 400, step 406 is conducted with a molten etchant bath that includes (by weight): (a) 45% to about 48% $KNO_3$; (b) 45% to about 48% $NaNO_3$; (c) 3% to 7% $Na_2CO_3$; and (d) 0.5% to 3% $LiNO_3$.

According to some implementations of the method 400 shown in FIG. 4, the textured glass article resulting from the completion of steps 402 and 406 (with or without optional step 404) includes both a textured region (e.g., textured region 30a having a plurality of sub-surface hillocks 22) and a compressive stress region, with the compressive stress region having a minimum compressive stress (CS) of 200 MPa and a DOC from 5 μm to 200 μm (e.g., compressive stress region 50) (see FIGS. 1 and 4). As such, embodiments of method 400 can be conducted such that the textured glass article develops both a textured region and a compressive stress region after the completion of the step 406 of etching the substrate in a molten etchant bath. Advantageously, the method 400 can be conducted to both strengthen a glass substrate and etch it to form a textured region, as including a plurality of sub-surface hillocks.

Without being bound by theory, it is believed that the method 400 depicted in FIG. 4 can obtain both a textured region and a compressive stress region in a glass substrate according to nucleation and etching mechanisms. As the glass substrate is submerged in the molten salt bath (i.e., in step 406) saturated with a high pH component (e.g., $K_2CO_3$, $Li_2CO_3$, etc.), these high pH inorganic salt crystals are nucleated and grown on the primary surface of the glass substrate. Further, the crystals are capable of etching the primary surface of the glass substrate at the elevated temperature of the molten etchant bath, leading to the development of a textured region that includes a plurality of sub-surface hillocks (see, e.g., FIGS. 2A and 2B). The depth (e.g., the average height 34 shown in FIG. 1) and size (e.g., the average lateral feature size 32 shown in FIG. 1) of the sub-surface hillocks, along with their density, can be controlled by tuning the nucleation and growth of these crystals through adjustments to the etching time and temperature in the etching step of the method (e.g., step 406). Further, it is believed that the textured region and its plurality of sub-surface hillocks, as developed according to the methods of the disclosure, can imbue the textured glass article with various optical properties, including anti-glare properties, such as a DOI of 99.5% or less, and low sparkle, e.g., a sparkle of less than 1% as measured by PPD with a 140 PPI light source.

Referring again to the method 400 depicted in FIG. 4, according to some embodiments, the method further includes a removing step (not shown) configured to remove excess etchant and leached substrate constituents from the etching step 406. That is, after steps 402 and 406 of the method 400, excess molten etchant from these steps, along with any loose and remnant constituents from the substrate 10, are then removed by rinsing the etchant on the primary surface 12 with deionized water. As would be understood by those with ordinary skill in the field of the disclosure, various mechanical and/or aqueous cleaning approaches can be employed in the removing step to remove excess etchant and leached substrate constituents without materially affecting the surface of the substrate 10.

EXAMPLES

The following examples describe various features and advantages provided by the disclosure, and are in no way intended to limit the invention and appended claims.

Example 1

Textured glass samples of Glass A, Glass B, Glass C and Corning® Eagle XG® glass having a thickness of 0.5 mm, 0.7 mm, 0.8 mm and 1.1 mm, respectively, were prepared according to the following method, as consistent with the principles of the disclosure. In particular, the samples were subjected to a method of making a textured glass article, consistent with the methods outlined earlier in the disclosure. In particular, the glass substrates were pre-heated to a temperature of 300° C. for 15 minutes; submerged in one of two molten salt etchant baths held at 390° C. for an etching duration of 105 minutes; cooled on a bench to ambient temperature; and then cleaned in deionized water. A comparative molten salt etchant bath (bath 1A) without a lithium salt constituent was used for half of the samples: 200 g $KNO_3$, 20 g $Na_2CO_3$ and 180 g $NaNO_3$. The other molten salt etchant bath (bath 1B) is consistent with the etchant baths of the disclosure: 200 g $KNO_3$, 3.2 g $LiNO_3$, 20 g $Na_2CO_3$ and 176.8 g $NaNO_3$.

Referring now to FIGS. 5A-5D, photographs are provided of the textured glass articles that were formed according to this example, as including substrates of Glass A, Glass B, Glass C and Eagle XG® glass, respectively. In particular, the left-hand side of each of FIGS. 5A-5D shows the glass samples submerged in bath 1A and the right-hand side of each of FIGS. 5A-5D shows the glass samples submerged in bath 1B. As is evident from the left-hand side of the figures, the glass samples subjected to a molten salt bath (bath 1A) without a lithium salt constituent appeared clear under edge light illumination. In contrast, the right-hand side of the figures shows the glass samples subjected to a molten etchant bath (bath 1B) with a lithium salt constituent, as containing obvious levels of haze. With magnification, it is evident that the haze observed in these samples is associated with a textured region that includes a plurality of sub-surface hillocks, as detailed earlier in the disclosure.

Example 2

According to this example, four sets of textured glass samples of Corning® Gorilla® Glass 5 having a thickness of 1.1 mm (50 mm in length×50 mm in width) were prepared according to the following method (Exs. 2A-2D), as consistent with the principles of the disclosure. In particular, the samples were subjected to a method of making a textured glass article, consistent with the methods outlined earlier in the disclosure. In particular, the glass substrates were submerged in a molten salt etchant bath held at 380° C. for an etching duration of 65 minutes; cooled on a bench to ambient temperature; and then cleaned in deionized water. The other molten salt etchant bath is consistent with the etchant baths of the disclosure (by weight): 47% $KNO_3$, 47% $NaNO_3$, 5% $Na_2CO_3$ and 1% $LiNO_3$.

Referring now to Table 1 below, optical data was developed by testing samples from each of the four sets of samples of this example (i.e., Exs. 2A-2D). In particular, transmittance ("% T"), haze ("% Haze"), gloss ("Gloss20", "Gloss60" and "Gloss85"), distinctness of image ("DOI") and sparkle ("% Sparkle 140 PPI") data is provided for these samples in Table 1. In addition, the data is reported for measurements made on both of the "A" and "B" sides of each sample, which correspond to its two opposing primary surfaces.

TABLE 1

Optical properties of textured glass articles

| Sample ID | Side | % T | % Haze | Gloss20° | Gloss60° | Gloss85° | DOI | % Sparkle 140 PPI |
|---|---|---|---|---|---|---|---|---|
| 2A | A | 94.0 | 4.63 | 85.6 | 111.1 | 110.5 | 99.2 | 0.38 |
|  | B | 94.1 | 4.68 | 85.6 | 111.0 | 110.5 | 99.3 | 0.41 |
| 2B | A | 94.1 | 4.73 | 78.2 | 107.9 | 110.3 | 99.2 | 0.76 |
|  | B | 94.1 | 4.70 | 78.0 | 108.3 | 110.0 | 99.2 | 0.63 |
| 2C | A | 94.1 | 4.68 | 83.4 | 109.8 | 110.4 | 99.2 | 0.39 |
|  | B | 94.1 | 4.66 | 85.6 | 110.6 | 110.4 | 99.3 | 0.37 |
| 2D | A | 94.1 | 4.77 | 80.0 | 108.7 | 110.5 | 99.3 | 0.42 |
|  | B | 94.0 | 4.76 | 81.3 | 108.6 | 110.4 | 99.2 | 0.43 |

According to a first aspect, a glass article is provided. The glass article comprises a glass substrate comprising a thickness and a primary surface; and a textured region defined by the primary surface. The textured region comprises a plurality of sub-surface hillocks, each hillock having a top surface and a base, the base located below the primary surface of the substrate. The plurality of hillocks comprises an average lateral feature size from 0.1 µm to 3 µm and an average height from 5 nm to 200 nm. Further, the primary surface of the substrate is substantially planar.

According to a second aspect, the first aspect is provided, wherein the plurality of hillocks comprises an average lateral feature size from 0.2 µm to 2 µm.

According to a third aspect, the first aspect is provided, wherein the top surface of each of the hillocks is substantially parallel to the primary surface.

According to a fourth aspect, the first aspect is provided, wherein the top surface of each of the hillocks is below the primary surface of the glass substrate.

According to a fifth aspect, the first aspect is provided, wherein the base of each hillock defines a moat in the primary surface.

According to a sixth aspect, any one of the first through fifth aspects is provided, wherein the glass substrate comprises a composition selected from the group consisting of an aluminosilicate glass, a borosilicate glass, a phosphosilicate glass, a soda lime glass, an alkali aluminosilicate glass, and an alkali aluminoborosilicate glass.

According to a seventh aspect, the first aspect is provided, wherein the glass substrate further comprises a compressive stress region that extends from the primary surface to a selected depth, and further wherein the compressive stress region comprises a minimum compressive stress (CS) of 200 MPa and a depth of compression (DOC) from 5 µm to 200 µm.

According to an eighth aspect, a glass article is provided. The glass article comprises a glass substrate comprising a thickness and a primary surface; and a textured region defined by the primary surface. The textured region comprises a plurality of sub-surface hillocks, each hillock having a top surface and a base, the base located below the primary surface of the substrate. The plurality of hillocks comprises an average lateral feature size from 0.1 µm to 3 µm and an average height from 5 nm to 200 nm. The glass article comprises a sparkle of less than 1% as measured by pixel power distribution (PPD) with a 140 pixels per inch (PPI) light source. Further, the primary surface of the substrate is substantially planar.

According to a ninth aspect, the eighth aspect is provided, wherein the plurality of hillocks comprises an average lateral feature size from 0.2 µm to 2 µm.

According to a tenth aspect, the eighth aspect is provided, wherein the glass substrate further comprises a compressive stress region that extends from the primary surface to a selected depth, and further wherein the compressive stress region comprises a minimum compressive stress (CS) of 200 MPa and a depth of compression (DOC) from 5 µm to 200 µm.

According to an eleventh aspect, the eighth aspect is provided, wherein the glass article further comprises a transmittance of at least 90% in the visible spectrum.

According to a twelfth aspect, the eighth aspect is provided, wherein the glass article further comprises a transmittance haze from 0.1% to 10% (or 0.1% to 90%).

According to a thirteenth aspect, the eighth aspect is provided, wherein the glass article further comprises a gloss from 70 to 120 (or 40-150), as measured at a 60° incident angle.

According to a fourteenth aspect, any one of the eighth through the thirteenth aspects is provided, wherein the glass substrate comprises a composition selected from the group consisting of an aluminosilicate glass, a borosilicate glass, a phosphosilicate glass, a soda lime glass, an alkali aluminosilicate glass, and an alkali aluminoborosilicate glass.

According to a fifteenth aspect, a method for making a glass article is provided. The method comprises providing a glass substrate comprising a thickness and a primary surface; and submerging the glass substrate in a molten etchant bath for an etching duration of 10 minutes to 1000 minutes, the etchant bath at an etching temperature from 350° C. to 500° C. The etchant bath comprises (by weight):
  (a) 30% to about 48% $KNO_3$ (or in a range of 0% to about 95% $KNO_3$);
  (b) 30% to about 48% $NaNO_3$ (or in a range of 0% to about 95% $NaNO_3$);
  (c) 3% to 10% $K_2CO_3$ or $Na_2CO_3$; and
  (d) 0.1% to 30% lithium salt.
The submerging is conducted to form a textured region in the glass substrate, and the textured region comprises a plurality of sub-surface hillocks, each hillock having a top surface and a base, the base located below the primary surface of the substrate. Further, the primary surface of the substrate is substantially planar.

According to a sixteenth aspect, the fifteenth aspect is provided, wherein the lithium salt is selected from the group consisting of $LiNO_3$, $Li_2CO_3$, $Li_2SO_4$ and LiCl.

According to a seventeenth aspect, the fifteenth aspect is provided, further comprising: heating the glass substrate to a temperature between 200° C. and the etching temperature, wherein the heating step is conducted before the submerging step.

According to an eighteenth aspect, the fifteenth aspect is provided, wherein the plurality of hillocks further comprises an average lateral feature size from 0.1 µm to 3 µm and an average height from 5 nm to 200 nm.

According to a nineteenth aspect, the fifteenth aspect is provided, wherein the glass article further comprises a sparkle of less than 1% as measured by pixel power distribution (PPD) with a 140 pixels per inch (PPI) light source.

According to a twentieth aspect, the fifteenth aspect is provided, wherein the submerging step is further conducted such that the glass substrate further comprises a compressive stress region that extends from the primary surface to a selected depth, and further wherein the compressive stress region comprises a minimum compressive stress (CS) of 200 MPa and a depth of compression (DOC) from 5 µm to 200 µm.

According to a twenty-first aspect, any one of the fifteenth through twentieth aspects is provided, wherein the glass substrate comprises a composition selected from the group consisting of an aluminosilicate glass, a borosilicate glass, a phosphosilicate glass, a soda lime glass, an alkali aluminosilicate glass, and an alkali aluminoborosilicate glass.

According to a twenty-second aspect, the fifteenth aspect is provided, wherein the etchant bath comprises (by weight):
  (a) 45% to about 48% $KNO_3$;
  (b) 45% to about 48% $NaNO_3$;
  (c) 3% to 7% $Na_2CO_3$; and
  (d) 0.5% to 3% $LiNO_3$.

According to a twenty-third aspect, the twenty-second aspect is provided, wherein the etching temperature is from 360° C. to 400° C. and the etching duration is from 20 minutes to 100 minutes.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A glass article, comprising:
   a glass substrate comprising a thickness and a primary surface; and
   a textured region defined by the primary surface,
   wherein the textured region comprises a plurality of exposed, sub-surface hillocks, each hillock having a top surface and a base, the base located at a depth below the primary surface of the glass substrate,
   wherein the plurality of hillocks comprises an average lateral feature size from 0.01 µm to 20 µm and an average height from 5 nm to 5000 nm,
   wherein the primary surface of the glass substrate is substantially planar, and
   further wherein the top surface of each of the hillocks is substantially planar and substantially parallel to the primary surface.

2. The glass article according to claim 1, wherein the average lateral feature size is from 0.1 µm to 10 µm and the average height is from 5 nm to 1000 nm.

3. The glass article according to claim 1, wherein the average lateral feature size is from 0.1 µm to 10 µm and the average height is from 5 nm to 400 nm.

4. The glass article according to claim 1, wherein each of the hillocks has a mesa-like appearance with the top surface at a depth below the primary surface of the glass substrate and the base is substantially round in shape.

5. The glass article according to claim 1, wherein the base of each hillock defines a moat in the primary surface.

6. The glass article according to claim 1, wherein the glass substrate further comprises a compressive stress region that extends from the primary surface to a selected depth, and further wherein the compressive stress region comprises a minimum compressive stress (CS) of 200 MPa and a depth of compression (DOC) from 5 µm to 200 µm.

7. A glass article, comprising:
   a glass substrate comprising a thickness and a primary surface; and
   a textured region defined by the primary surface,
   wherein the textured region comprises a plurality of exposed, sub-surface hillocks, each hillock having a top surface and a base, the base located at a depth below the primary surface of the glass substrate,
   wherein the plurality of hillocks comprises an average lateral feature size from 0.01 µm to 20 µm and an average height from 5 nm to 5000 nm,
   wherein the glass article comprises a sparkle of less than 1% as measured by pixel power distribution (PPD) with a 140 pixels per inch (PPI) light source,
   wherein the primary surface of the glass substrate is substantially planar, and
   further wherein the top surface of each of the hillocks is substantially planar and substantially parallel to the primary surface.

8. The glass article according to claim 7, wherein the average lateral feature size is from 0.1 µm to 10 µm and the average height is from 5 nm to 1000 nm.

9. The glass article according to claim 7, wherein the average lateral feature size is from 0.1 µm to 10 µm and the average height is from 5 nm to 400 nm.

10. The glass article according to claim 7, wherein the glass substrate further comprises a compressive stress region that extends from the primary surface to a selected depth, and further wherein the compressive stress region comprises a minimum compressive stress (CS) of 200 MPa and a depth of compression (DOC) from 5 µm to 200 µm.

11. The glass article according to claim 7, wherein the glass article further comprises a transmittance of at least 90% in the visible spectrum.

12. The glass article according to claim 7, wherein the glass article further comprises a transmittance haze from 0.1% to 10%.

13. The glass article according to claim 7, wherein the glass article further comprises a gloss from 70 to 120, as measured at a 60° incident angle.

14. The glass article according to claim 7, wherein each of the hillocks has a mesa-like appearance with the top surface at a depth below the primary surface of the glass substrate and the base is substantially round in shape.

15. A method of making a glass article, comprising:
    providing a glass substrate comprising a thickness and a primary surface; and
    submerging the glass substrate in a molten etchant bath for an etching duration of 10 minutes to 1000 minutes, the etchant bath at an etching temperature from 350° C. to 500° C.,
    wherein the etchant bath comprises (by weight):
    (a) 30% to about 48% $KNO_3$;
    (b) 30% to about 48% $NaNO_3$;
    (c) 3% to 10% $K_2CO_3$ or $Na_2CO_3$; and
    (d) 0.1% to 30% lithium salt,
    wherein the submerging is conducted to form a textured region in the glass substrate, and the textured region comprises a plurality of exposed, sub-surface hillocks, each hillock having a top surface and a base, the base located at a depth below the primary surface of the glass substrate,
    wherein the plurality of hillocks comprises an average lateral feature size from 0.01 µm to 20 µm and an average height from 5 nm to 5000 nm,
    wherein the primary surface of the glass substrate is substantially planar, and
    further wherein the top surface of each of the hillocks is substantially planar and substantially parallel to the primary surface.

16. The method according to claim 15, wherein the average lateral feature size is from 0.1 µm to 10 µm and the average height is from 5 nm to 1000 nm.

17. The method according to claim 15, wherein the average lateral feature size is from 0.1 µm to 10 µm and the average height is from 5 nm to 400 nm.

18. The method according to claim 15, wherein the lithium salt is selected from the group consisting of $LiNO_3$, $Li_2CO_3$, $Li_2SO_4$ and LiCl.

19. The method according to claim 15, further comprising:
    heating the glass substrate to a temperature between 200° C. and the etching temperature, wherein the heating step is conducted before the submerging step.

20. The method according to claim 15, wherein the glass article further comprises a sparkle of less than 1% as measured by pixel power distribution (PPD) with a 140 pixels per inch (PPI) light source.

\* \* \* \* \*